(12) United States Patent
Park et al.

(10) Patent No.: US 7,409,535 B2
(45) Date of Patent: Aug. 5, 2008

(54) BRANCH TARGET PREDICTION FOR MULTI-TARGET BRANCHES BY IDENTIFYING A REPEATED PATTERN

(75) Inventors: Il Park, White Plains, NY (US); Pratap C. Pattnaik, Ossining, NY (US); Jong-Deok Choi, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 11/110,240

(22) Filed: Apr. 20, 2005

(65) Prior Publication Data

US 2006/0242393 A1  Oct. 26, 2006

(51) Int. Cl.
*G06F 9/38* (2006.01)
(52) U.S. Cl. .................. 712/240; 712/238; 712/235
(58) Field of Classification Search .................. 712/236, 712/239, 238, 235, 240
See application file for complete search history.

(56) References Cited

U.S. PATENT DOCUMENTS

| 5,721,855 | A | * | 2/1998 | Hinton et al. | ............... 712/218 |
| 5,751,985 | A | * | 5/1998 | Shen et al. | ................... 712/218 |
| 5,892,936 | A | * | 4/1999 | Tran et al. | .................... 712/216 |
| 6,014,734 | A | * | 1/2000 | Tran et al. | ...................... 712/23 |
| 7,107,437 | B1 | * | 9/2006 | Padwekar | .................... 712/238 |

* cited by examiner

*Primary Examiner*—Tonia L. M. Dollinger
(74) *Attorney, Agent, or Firm*—Michael J. Buchenhorner; Douglas W. Cameron

(57) ABSTRACT

An information processing system for branch target prediction is disclosed. The information processing system includes a memory for storing entries, wherein each entry includes a plurality of target addresses representing a history of target addresses for a multi-target branch and logic for reading the memory and identifying a repeated pattern in a plurality of target addresses for a multi-target branch. The information processing system further includes logic for predicting a next target address for the multi-target branch based on the repeated pattern that was identified.

5 Claims, 5 Drawing Sheets

BRANCH TARGET PREDICTION FOR MULTI-TARGET BRANCHES BY IDENTIFYING A REPEATED PATTERN

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of microprocessors and more particularly relates to the field of branch target prediction in microprocessors.

BACKGROUND OF THE INVENTION

A branch, in a computer program, is a jump or departure from the implicit or declared order in which instructions are being executed. Instruction pre-fetch is a technique which attempts to minimize the time a processor spends waiting for instructions to be fetched from memory. Instructions following the instruction currently being executed are loaded into a pre-fetch queue when the processor's external bus is otherwise idle. If the processor executes a branch instruction or receives an interrupt, then the queue must be flushed and reloaded from the new address.

Branch target prediction is a technique used in some processors with instruction pre-fetch to guess whether a conditional branch will be taken or not and pre-fetch code from the appropriate location. When a branch instruction is executed, its address and that of the next instruction executed (the chosen destination of the branch) are stored in the branch target buffer. This information is used to predict which way the instruction will branch the next time it is executed so that instruction pre-fetch can continue. When the prediction is correct (and it is correct most of the time), executing a branch does not cause a pipeline break. Some later processors simply pre-fetch both paths instead of trying to predict which way the branch will go. A branch target buffer is a register used to store the predicted destination of a branch in a microprocessor using branch prediction. Branch target prediction, however, does not come without its drawbacks.

The PowerPC processor, for example, decodes instructions including branches and classifies the type of each branch prior to making branch prediction. The PowerPC processor utilizes three hardware components to predict branches. The first component is a Branch History Table (BHT) for a conditional branch to predict whether or not the branch will be taken. The second component is a link stack to predict the target address of a branch that is an indirect branch and corresponds to a subroutine return. The third component is a count cache used to predict the target address of a branch that is an indirect branch but does not correspond to a subroutine return.

The prediction accuracy of the BHT and the link stack is very high. But unlike these two structures, the count cache has low prediction accuracy especially for applications written in C++ or Java. When a branch commits, the branch stores its current target address to the entry in the count cache indexed by its hashed program counter. When the same branch is fetched, the branch accesses the count cache with its hashed program counter, and the relevant entry in the count cache returns the stored target. Such a prediction mechanism is vulnerable to a branch that has multiple different target addresses, because it does not keep track of all possible targets but stores only the most recent target. However, because branch prediction has significant design constraints in terms of design complexity and wire delay, it is difficult to implement a sophisticated algorithm to predict the next target address accurately for a hard-to-predict branch (i.e., a multi-target branch).

Therefore, a need exists to overcome the problems with the prior art as discussed above, and particularly for a more efficient way to predict the next target address for multi-target branches in microprocessors.

SUMMARY OF THE INVENTION

Briefly, according to an embodiment of the present invention, an information processing system for branch target prediction is disclosed. The information processing system includes a memory for storing entries, wherein each entry includes a plurality of target addresses representing a history of target addresses for a multi-target branch and logic for reading the memory and identifying a repeated pattern in a plurality of target addresses for a multi-target branch. The information processing system further includes logic for predicting a next target address for the multi-target branch based on the repeated pattern that was identified.

In another embodiment of the present invention, a method for branch target prediction is disclosed. The method includes storing a plurality of entries in a memory, wherein each entry includes a plurality of target addresses representing a history of target addresses for a multi-target branch and it s next predicted address and reading the memory and identifying a repeated pattern in a plurality of target addresses for a multi-target branch. The method further includes predicting a next target address for the multi-target branch based on the repeated pattern that was identified.

In another embodiment of the present invention, a computer readable medium including computer instructions for branch target prediction is disclosed. The computer instructions include instructions for storing a plurality of entries in a memory, wherein each entry includes a plurality of target addresses representing a history of target addresses for a multi-target branch and reading the memory and identifying a repeated pattern in a plurality of target addresses for a multi-target branch. The computer instructions further include instructions for predicting a next target address for the multi-target branch based on the repeated pattern that was identified.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

Figure 1:
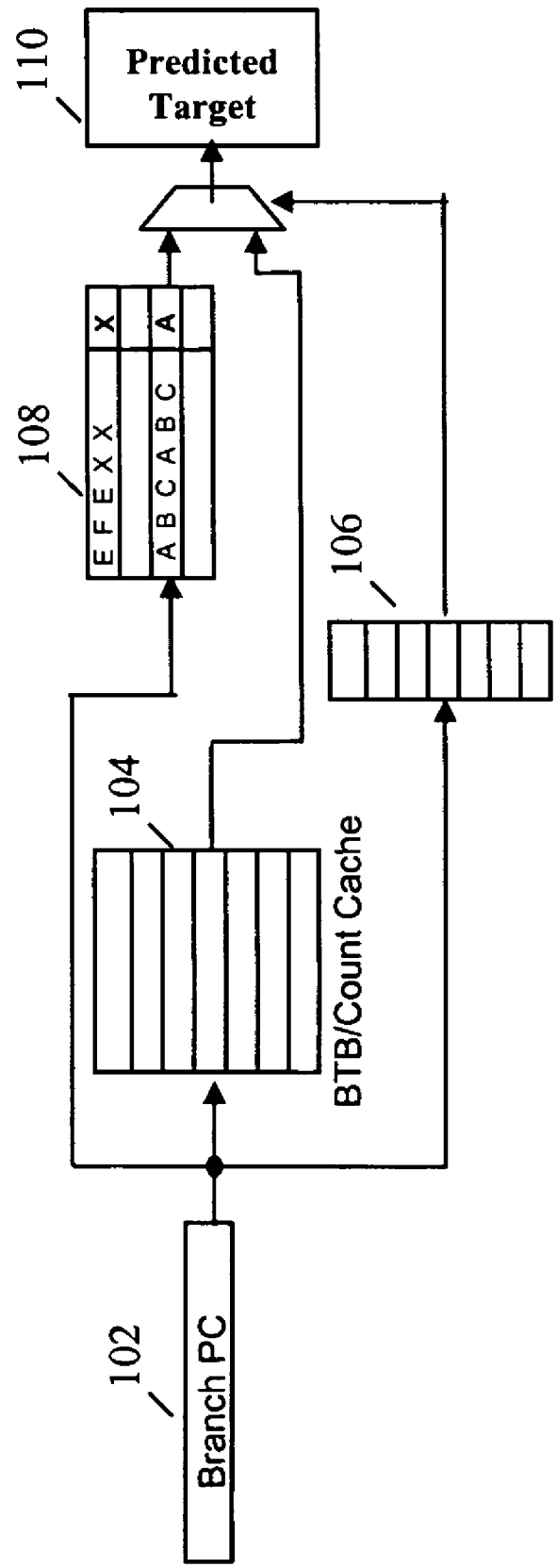
FIG. 1 is a block diagram illustrating the overall architecture of one embodiment of the present invention.

The present invention provides a method, information processing system and computer readable medium for predicting the next target address for a branch that has multiple different target addresses (i.e., a multi-target branch). FIG. 1 is a block diagram illustrating the overall architecture of one embodiment of the present invention. FIG. 1 includes a branch program counter (PC) 102, a branch target buffer (BTB)/count cache 104, a memory 106, a memory 108 and a result 110. A branch PC 102 is an instruction address for a fetched branch. A BTB/count cache 104 is a conventional table-like hardware to predict next target addresses for branches. A hashed branch PC 102 is used as an index when a BTB/count cache 104 is accessed. Memory 106 and memory 108 comprise extra hardware required to implement one embodiment of the present invention over the genuine branch predictor of a conventional, commercially available microprocessor.

Memory 106 can be a Random Access Memory (RAM) or any other type of readable/writable memory. In one embodiment of the present invention, memory 106 is a single bit vector wherein each bit corresponds to a single branch and indicates whether or not that branch is a multi-target branch. However, in general, each entry of memory 106 can be a multi-bit counter represented as "Fcount" in FIGS. 3A and 3B below. Memory 106 is described in more detail below.

Memory 108 can be any type of readable/writable memory, as in memory 106. In one embodiment of the present invention, memory 108 allows for the storage of entries, wherein each entry includes a plurality of target addresses representing a history of target addresses for a single multi-target branch. Memory 108 is described in greater detail below with reference to FIG. 2.

In yet another embodiment of the present invention, each entry stored in memory 108 is implemented as a first-in-first-out (FIFO) queue wherein target addresses are stored in the queue in the order in which they are executed. Note that an entry is entered into the memory 108 for a branch only if the branch has multiple different targets, i.e., a multi-target branch. In another embodiment, an entry is entered into the memory 108 for a branch only if the branch is a multi-target branch and an indirect branch. A direct branch decides the target address by adding the branch PC and the offset specified in the branch instruction. In a Reduced Instruction Set Computer (RISC) machine, such as a PowerPC, the target of direct branches can be easily known by using pre-decoding logic. Conversely, an indirect branch decides the target address by extracting the contents from a register specified in the branch instruction. Therefore, the target address for the indirect branch will not be ready for a period of time until all previous instructions dependent on the register are executed. Moreover, the register contents can be modified by previous instructions during the execution, thus making it difficult to predict the register contents accurately.

Therefore, memory 108 and the pattern identification process are only utilized for a branch that is an indirect branch and has multiple targets. For other branches, a genuine predictor such as the count cache or branch target buffer 104 is used. The manner in which a multi-target branch is identified is described in greater detail below. By limiting the usage of memory 108 and the pattern identification process, the load burden on memory 108 and the pattern identification process is reduced. It should be noted that usage of the memory 108 and the count cache (or branch target buffer) 104 is disjoint. Hence, branches whose targets are predicted by memory 108 and the pattern identification process do not occupy entries in the count cache or branch target buffer 104.

To conserve space in memory 108, the compressed form of a target address can be stored instead of using complete 64-bit (or 32-bit for 32-bit processors) addresses. One way of accomplishing this compression is to store only an offset distance from the page boundary of the branch PC 102. This optimization sacrifices the prediction accuracy if the target address goes beyond the page boundary of the current branch. To achieve better performance and still conserve space in the memory 108, we can choose N least significant bits of the target address. The value N can be set statically or dynamically depending on applications deemed to be most important.

Multi-target branches are identified using the memory 106. In one embodiment, a table in memory 106 contains information used to distinguish whether a branch is a multi-target branch. For example, an entry in the memory 106, such as a bit or segment of bits, corresponds to each branch. The table in memory 106 is indexed with the PC 102 of a branch. When a branch corresponds to a matched entry from the count cache or branch target buffer 104 and then makes a wrong prediction, the branch may be considered a multi-target branch. In this case, the memory 106 is accessed with the branch PC 102. If the value of the relevant entry in the memory 106 is smaller than a predefined value, the value of the entry is increased by one. Otherwise, the entry is not modified. The table in memory 106 is cleared to zero periodically.

Generally, the target address prediction process involves the elements of FIG. 1 above. When a branch commits, the table in memory 106 is accessed. If the entry in the table of the memory 106 that corresponds to the current branch possesses a predefined value, the branch is considered a multi-target branch. Consequently, the memory 108 is indexed with the branch PC 102. If there is a matched entry in memory 108, the current target is pushed into the entry and the oldest target in the entry is unallocated if necessary. Thus, when a branch commits, the entry corresponding to that branch is updated in the memory 108 with a current target address. Subsequently, the present invention identifies any repeated pattern among previous targets by using a predefined pattern-matching algorithm. The next target is predicted based on the identified pattern, if any. The predicted target address is used later when the same branch is fetched and a target address has to be predicted. The pattern matching algorithm as well as the target prediction process are described in greater detail below.

When a branch is fetched, the present invention accesses the count cache (or branch target buffer) 104, the memory 106, and the memory 108 at the same time. If the relevant entry in the memory 106 possesses a predefined value, the result from the prediction process using memory 108 is used. If the value of the relevant entry in the memory 106 is smaller than a predefined value, the result from the count cache (or branch target buffer) 104 is used. Subsequently, if a branch finds a matched entry from the count cache (or branch target buffer) 104 and the result from the entry later turns out to be a wrong prediction, the branch is considered a multi-target branch. In this case, the memory 106 is updated properly as described above.

The performance of the target address prediction process using memory 108 largely depends on the efficiency of the pattern-matching algorithm that is used to recognize a pattern among stored previous targets. However, because branch prediction has huge design constraints in terms of component area and wire delay, it is extremely difficult to implement a sophisticated algorithm for such purpose while satisfying all design constraints. One embodiment of a pattern matching algorithm is described in greater detail below.

Figure 2:
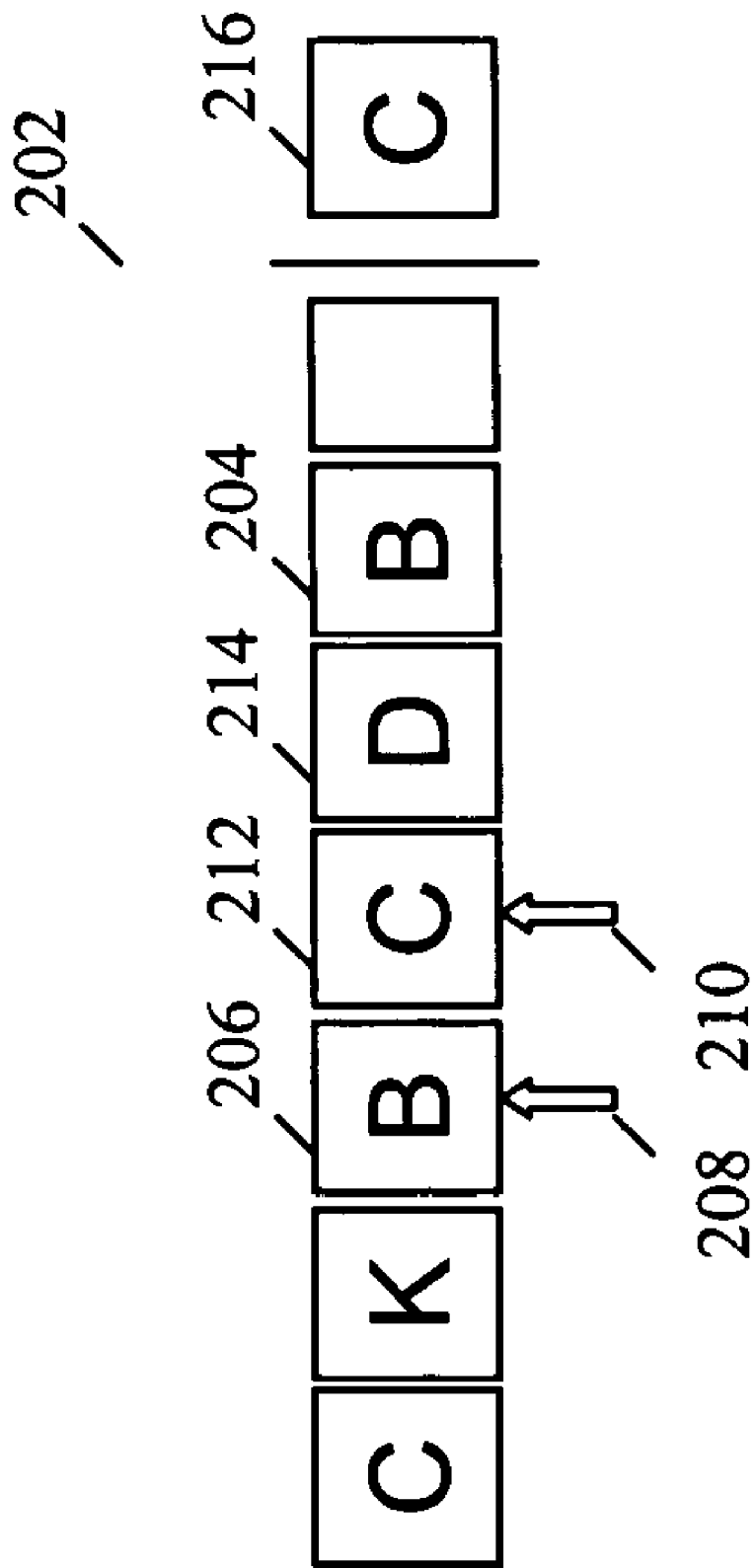
FIG. 2 is a block diagram illustrating a pattern matching algorithm, in one embodiment of the present invention.

In one embodiment of the present invention, a pattern-matching algorithm utilizes the stored target addresses for a multi-target branch. FIG. 2 is a block diagram illustrating a pattern matching algorithm, in one embodiment of the present invention. FIG. 2 shows a section of memory 108, i.e., an entry 202, including one FIFO queue populated with target addresses for one multi-target branch.

In the first step in the process, the current target address is identified as target address 204. In following step, the next most recent occurrence of target address 204 is sought in the entry 202. The next most recent occurrence of target address 204 is found at target address 206 and a pointer 208 to this target address is instantiated. All target addresses between target address 204 and target address 206 are considered members of a looped pattern. Next, a pointer 210 pointing to the target address 212, which follows target address 206, is instantiated. Target address 212 indicated by pointer 210 is considered the next predicted target address, and the address of 212 is copied to the address 216. If target address 206 that is matched with the target address 204 is not found from the entry 202, the most recent target address, target address 204, is considered the next predicted target address, and the address of 204 is copied to the address 216. The storage to keep the address 216 is a separate storage in the entry rather than a part of the FIFO queue structure of the entry.

Subsequently, the current entry 202 is updated with the current target address when a branch commits. For the next predicted target address, the process above is repeated such that the pointer 210 is moved by one slot to the right to target address 214, until the current pattern causes a mis-prediction.

The time consuming portion of the pattern matching implementation described above is updating the entry 202 in the memory 108, identifying a repeated pattern among previous target addressees, and making a prediction based on the identified pattern. These activities are executed when a branch commits, which is not in the critical path of the microprocessor. Only accessing memory 108 to recall the predicted target address is in the critical path of the microprocessor. Extracting a predicted target address is achieved by reading only the address 216 in the relevant entry 202 in the memory 108. Accessing the memory 106 is overlapped by memory 108 access. However, memory 108 access for extracting a predicted target exhibits a similar delay as BTB/count cache 104 access. Therefore, the aforementioned embodiment of the present invention does not place extra pressure or stress on the critical path of the microprocessor.

When predicting the target address for the current branch, there are two possible cases that can occur when a branch is fetched and the count cache 104 is accessed. One case is that a relevant target is found for the current branch at the count cache, which is considered a "hit" in the count cache. The other case is that a relevant target address is not found for the current branch at the count cache, which is considered a "miss" in the count cache. As illustrated below with reference to FIGS. 3-4, the "hit" or "miss" state is used later in the decision-making process, when the branch finishes execution.

Figure 3B:
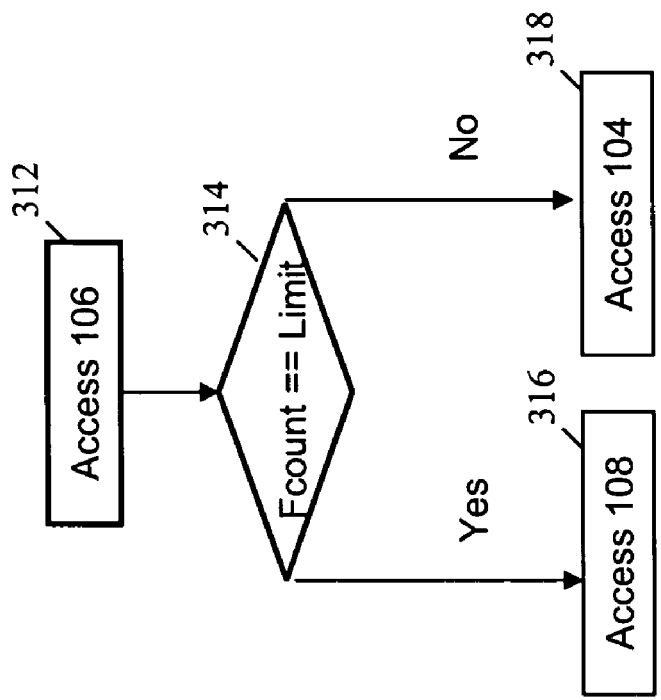
FIG. 3B is a flow chart depicting an alternative control flow of the multi-target determination process, in one embodiment of the present invention.
Figure 3A:
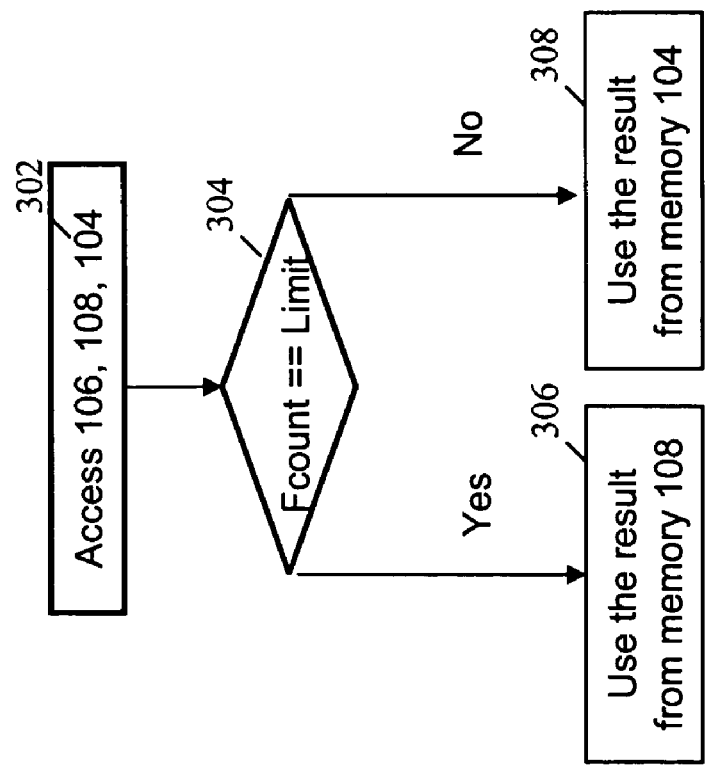
FIG. 3A is a flow chart depicting the control flow of the multi-target determination process, in one embodiment of the present invention.

FIG. 3A is a flow chart depicting the control flow of the multi-target determination process, in one embodiment of the present invention. In step 302, the memory 106, 108, and 104 are accessed. In step 304, it is determined whether the variable Fcount is equal to the variable Limit, wherein Fcount represents the value from an N bit-counter (or a single bit depending on the implementation) in the accessed entry of the memory 106, and Limit represents a predefined constant. If (Fcount==Limit), the corresponding branch is considered a multiple-target branch, and the result of accessing memory 108 is used for prediction in step 306. If (Fcount<Limit), the corresponding branch is not considered a multiple-target branch and the result of accessing memory 104 is used for prediction in step 308.

FIG. 3B is a flow chart depicting an alternative control flow of the multi-target determination process, in one embodiment of the present invention. FIG. 3B depicts an alternative for the implementation of FIG. 3A.

In step 312, the memory 106 is accessed. In step 314, it is determined whether the variable Fcount is equal to the variable Limit, wherein Fcount represents the value from an N bit-counter (or a single bit depending on the implementation) in the accessed entry of the memory 106, and Limit represents a predefined constant. If (Fcount==Limit), the corresponding branch is considered a multiple-target branch, and the result of accessing memory 108 is used for prediction in step 316. If (Fcount<Limit), the corresponding branch is not considered a multiple-target branch and the result of accessing memory 104 is used for prediction in step 318.

FIG. 3A optimizes the circuit delay by accessing the memory 108, 106 and 104 simultaneously before knowing which of the results from the memory 108 or the memory 104 should be used. As opposed to the implementation shown in FIG. 3A, the implementation in FIG. 3B optimizes power consumption by deciding which results of the accesses should be used later and then accessing only the memory it requires. Therefore, this alternate implementation can avoid useless accesses. However, this alternative forces the memory 106 access and the memory 108 (or 104) access in sequential order. As a result, the implementation shown in FIG. 3B will have extra wire-delay that is not present in the implementation in FIG. 3A.

Figure 4:
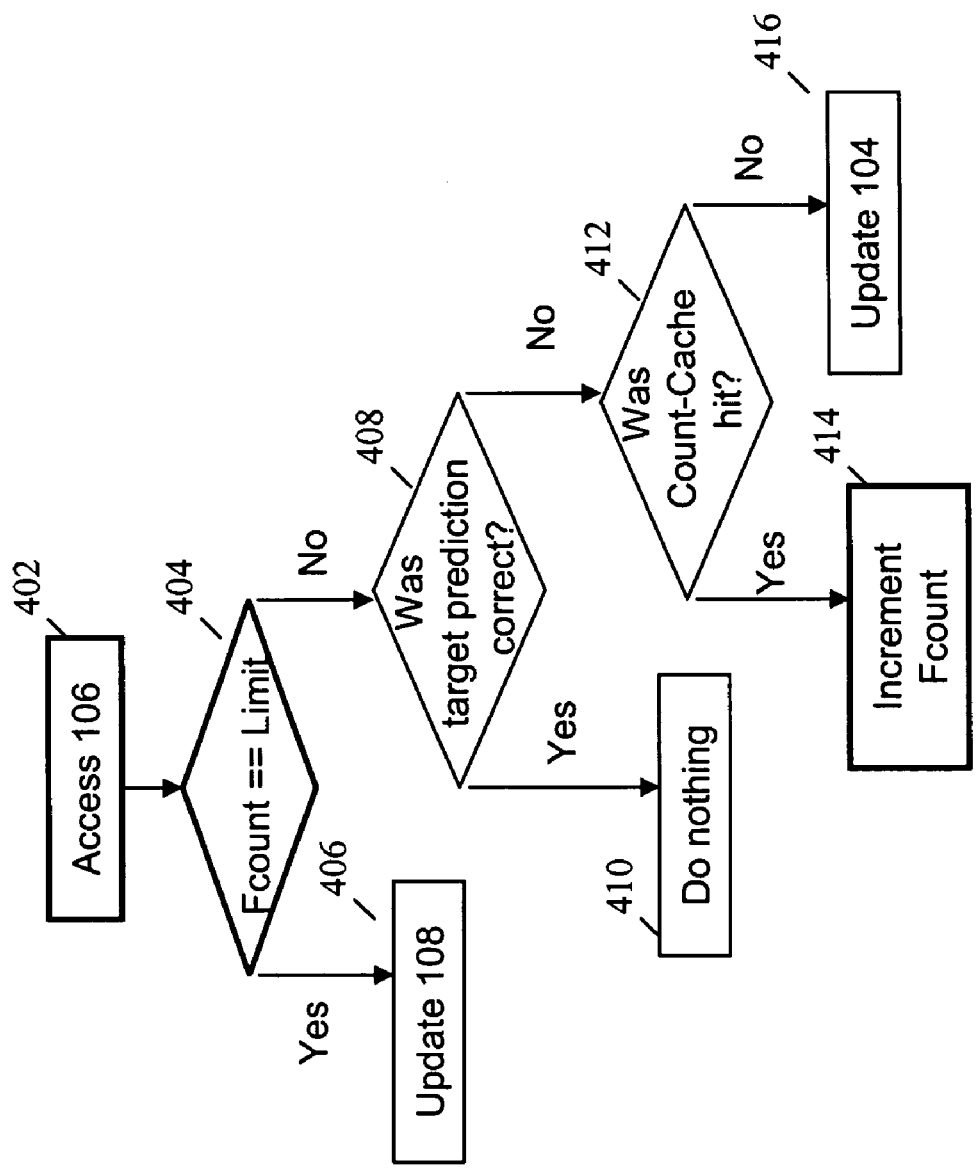
FIG. 4 is another flow chart depicting the control flow of the post-multi-target determination process, in one embodiment of the present invention.

FIG. 4 is another flow chart depicting the control flow of the post-multi-target determination process, in one embodiment of the present invention. In step 402, the memory 106 is accessed and in step 404 it is determined whether Fcount is equal to Limit. If (Fcount==Limit), the memory 108 is updated in step 406. If (Fcount<Limit), it is determined in step 408 whether the target prediction was correct. If the result of the determination of step 408 is affirmative, no steps are taken, as indicated in 410. If the result of the determination of step 408 is negative, then it is determined in step 412 whether the count cache 104 was hit or missed. If the result of the determination of step 412 is affirmative, then the variable Fcount is incremented in step 414. If the result of the determination of step 412 is negative, then the count cache 104 is updated in step 416.

In one embodiment of the present invention, a table, implemented in memory 106, is used to recognize a branch with multiple targets, i.e., a multi-target branch. In one embodiment of the present invention, a single-bit vector is used for memory 106, instead of allocating multiple bits per entry. When a branch is fetched, the present invention accesses the count cache (or branch target buffer) 104, the memory 106, and the memory 108 at the same time. Consequently, there are two possible outcomes depending on the value of the corresponding bit in the memory 106.

In the first possible outcome, if the relevant bit in the memory 106 is zero, the result from the count cache (or branch target buffer) 104 is used. Subsequently, if a branch finds a matched entry from the count cache (or branch target buffer) 104 and the result from the entry later turns out to be a wrong prediction, the branch is considered a multi-target branch. In this case, the memory 106 is accessed with the hashed branch PC 102, and the relevant bit in the memory 106 is incremented to one. If the branch cannot find a matched entry from the count cache (or branch target buffer) 104, or if the target prediction turns out to be correct, the content of the memory 106 is not modified. The role of count cache 104 in the multi-target branch determination process is described in greater detail below with reference to FIGS. 3-4.

In the second possible outcome, if the relevant bit in the memory 106 is one, the result from prediction process using memory 108 is used. When the branch commits, it updates the memory 108 with its correct target address and predicts a next target address. The memory 106 is cleared periodically.

In the case of using a bit vector implementation for memory 106, Fcount showin in FIGS. 3-4 has only two possible values, zero or one, and Limit will be one. Other than this difference, all previous descriptions with multi-bit counter implementation are applicable to them with a bit vector implementation.

The present invention can be realized in hardware, software, or a combination of hardware and software. A system according to a preferred embodiment of the present invention can be realized in a centralized fashion in one processor, or in a distributed fashion where different elements are spread across several processors. Any kind of information processing system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which, when loaded in a computer system, is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, which allow a computer system to read such computer readable information.

Figure 5:
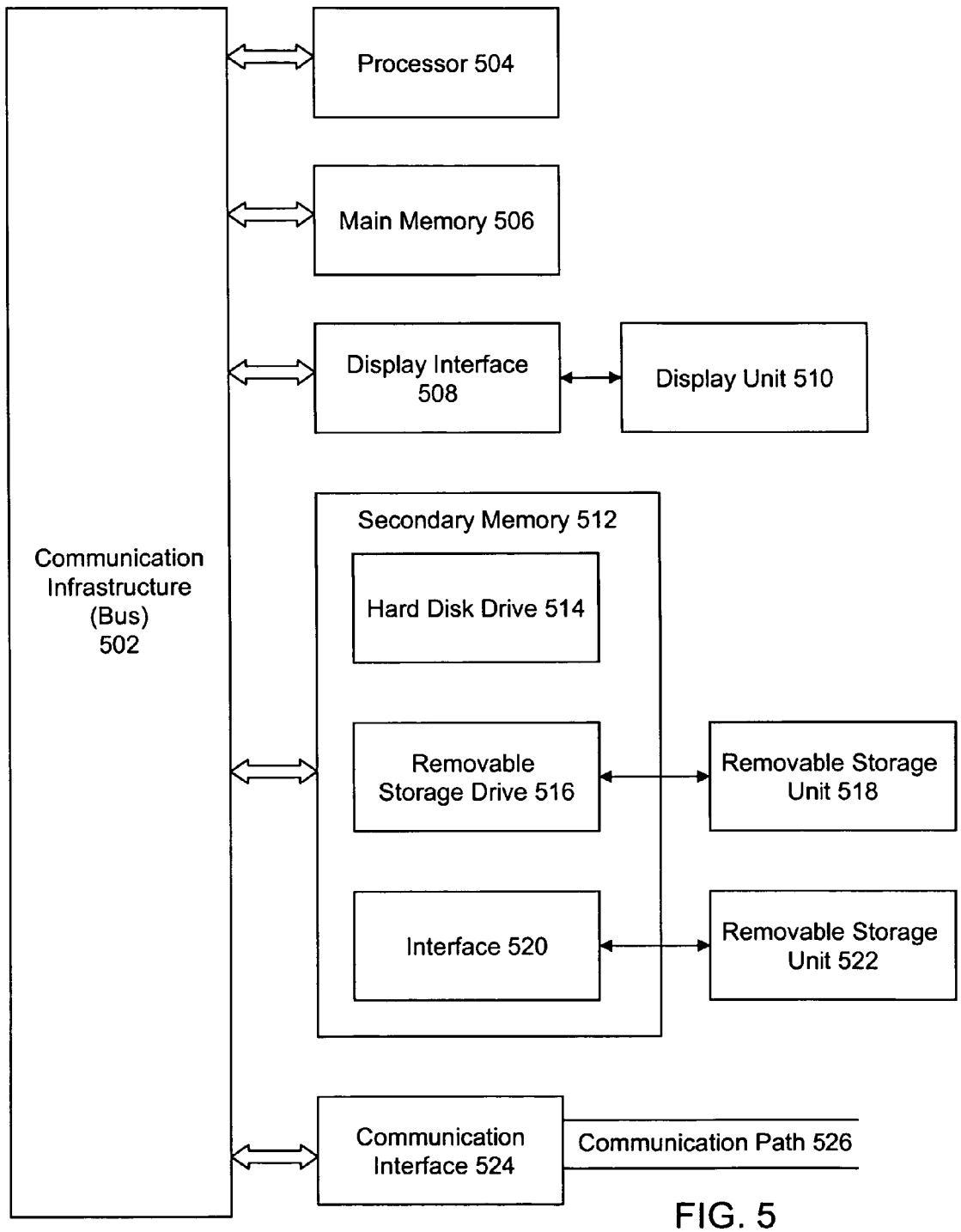
FIG. 5 is a high level block diagram showing an information processing system useful for implementing one embodiment of the present invention.

FIG. 5 is a high level block diagram showing an information processing system useful for implementing one embodiment of the present invention. The computer system includes one or more processors, such as processor 504. The processor 504 is connected to a communication infrastructure 502 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 508 that forwards graphics, text, and other data from the communication infrastructure 502 (or from a frame buffer not shown) for display on the display unit 510. The computer system also includes a main memory 506, preferably random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. Removable storage unit 518, represents a floppy disk, a compact disc, magnetic tape, optical disk, etc. which is read by and written to by removable storage drive 516. As will be appreciated, the removable storage unit 518 includes a computer readable medium having stored therein computer software and/or data.

In alternative embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system.

The computer system may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (i.e., channel) 526. This channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allow a computer to read such computer readable information.

Computer programs (also called computer control logic) are stored in main memory 506 and/or secondary memory 512. Computer programs may also be received via communications interface 524. Such computer programs, when executed, enable the computer system to perform the features of the present invention as discussed herein. In particular, the computer programs, when executed, enable the processor 504 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method for branch target prediction, comprising:
    storing a plurality of entries for each multi-target branch in a memory, wherein each entry includes a plurality of target addresses representing a history of target addresses for each single branch in the multi-target branch and its next predicted target address;
    reading the memory and identifying a repeated pattern in each of the plurality of target addresses for the multi-target branch;
    predicting a next target address for the multi-target branch based on the repeated pattern that was identified, using a pattern matching algorithm;
    determining whether a branch is a multi-target branch; and
    executing the step of storing, the step of reading and the step of predicting only if the branch is the multi-target branch.

2. The method of claim 1, wherein the step of storing comprises:
    storing a plurality of entries in the memory, wherein each entry includes a separate storage for keeping the predicted next target and a first-in-first-out queue for storing the plurality of target addresses representing a history of target addresses for the multi-target branch.

3. The method of claim 1, wherein the step of storing comprises: storing the plurality of entries in the memory comprising a Random Access Memory, wherein each entry includes the plurality of target addresses representing a history of target addresses for the multi-target branch.

4. The method of claim 1, wherein the step of reading comprises:
    reading the memory and identifying the repeated pattern in the plurality of target addresses for the multi-target branch by:
    reading a most recent target address from the plurality of target addresses;
    searching the plurality of target addresses for a next most recent target address matching the most recent target address; and
    identifying the target address that occurred immediately after the next most recent target address matching the most recent target address, using a pattern matching algorithm.

5. The method of claim 4, wherein the step of predicting comprises:
    predicting the next target address for the multi-target branch by accepting the target address that was identified as the next target address; and storing the predicted target address into a separate storage cell in the entry.

* * * * *